US010938910B2

(12) United States Patent
Banerjee et al.

(10) Patent No.: US 10,938,910 B2
(45) Date of Patent: Mar. 2, 2021

(54) DISCOVERING CAPABILITIES OF ENTITIES IN AN INTERNET OF THINGS SETTING

(71) Applicant: International Business Machines Corporation, Armonk, NY (US)

(72) Inventors: Nilanjan Banerjee, Kolkata (IN); Ravi Kothari, New Delhi (IN); Amit Anil Nanavati, New Delhi (IN); Raghavendra Singh, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 120 days.

(21) Appl. No.: 14/789,458

(22) Filed: Jul. 1, 2015

(65) Prior Publication Data

US 2017/0005874 A1   Jan. 5, 2017

(51) Int. Cl.
H04L 29/08   (2006.01)

(52) U.S. Cl.
CPC ............ H04L 67/125 (2013.01); H04L 67/16 (2013.01)

(58) Field of Classification Search
CPC .............................. H04L 67/125; H04L 67/16
USPC ........................................................ 709/223
See application file for complete search history.

(56) References Cited

U.S. PATENT DOCUMENTS

| 7,680,906 | B2 | 3/2010 | Helander |
| 8,422,994 | B2 * | 4/2013 | Rhoads .................. G01C 21/20 |
| | | | 455/411 |
| 8,620,682 | B2 | 12/2013 | Bechtel et al. |
| 8,671,099 | B2 | 3/2014 | Kapoor et al. |
| 8,874,266 | B1 | 10/2014 | Francis, Jr. et al. |
| 2002/0007510 | A1 | 1/2002 | Mann |
| 2006/0004703 | A1 * | 1/2006 | Spivack ............. G06F 17/3089 |
| 2006/0224318 | A1 | 10/2006 | Wilson, Jr. et al. |
| 2013/0178985 | A1 | 7/2013 | Lombard et al. |
| 2014/0169355 | A1 | 6/2014 | Jing et al. |
| 2014/0222730 | A1 | 8/2014 | Vasseur et al. |
| 2014/0241354 | A1 | 8/2014 | Shuman et al. |
| 2014/0244833 | A1 | 8/2014 | Sharma et al. |
| 2015/0043426 | A1 | 2/2015 | Aggarwal et al. |
| 2015/0149563 | A1 | 5/2015 | Shaw et al. |
| 2015/0193697 | A1 * | 7/2015 | Vasseur ................ G06N 99/005 |
| | | | 706/12 |
| 2016/0105292 | A1 | 4/2016 | Choi et al. |
| 2016/0179462 | A1 | 6/2016 | Bjorkengren |
| 2016/0315996 | A1 | 10/2016 | Ha et al. |

(Continued)

OTHER PUBLICATIONS mathworks.com, Anatomy of a Lookup Table, Apr. 18, 2014 (1 page).*
en.wikipedia.org, Lookup table, Jun. 18, 2013 (7 pages).*

*Primary Examiner* — Wing F Chan
*Assistant Examiner* — Leon Y Tseng
(74) *Attorney, Agent, or Firm* — Ference & Associates LLC

(57) ABSTRACT

Methods and arrangements for data-driven discovery of collaborative models in an internet of things. At a device in the internet of things setting, data are collected on ambient conditions, and the collected data are stored at the device. At least one other device in the internet of things is communicated with to create and record collaborative states relative to the device and the at least one other device. Other variants and embodiments are broadly contemplated herein.

19 Claims, 4 Drawing Sheets

|  | Temp | Bright | Sound |
|---|---|---|---|
| Temp | D(30,20)<br>LF(10,20) | D(30,20,2)<br>LF(10,20,2) |  |
| Bright | LF(30,20,2)<br>D(10,20,2) | D(30,2)<br>LF(10,2) |  |
| Sound |  |  | SP(3,20) |

205

(56) References Cited

U.S. PATENT DOCUMENTS

2017/0339231 A1 11/2017 Lee et al.
2017/0367132 A1 12/2017 Sinha

* cited by examiner

| | Temp | Bright | Sound |
|---|---|---|---|
| Temp | D(30,20)<br>LF(10,20) | D(30,20,2)<br>LF(10,20,2) | |
| Bright | LF(30,20,2)<br>D(10,20,2) | D(30,2)<br>LF(10,2) | |
| Sound | | | SP(3,20) |

DISCOVERING CAPABILITIES OF ENTITIES IN AN INTERNET OF THINGS SETTING

The Internet of Things (IOT), as generally known, has significant practical implications in many everyday settings. Consumers and others can benefit from devices (e.g., home-based appliances and items such as refrigerators, air conditioners, televisions, lights and lamps, etc.) that may have sensing, communication, and actuation capabilities to reach a desired state. The actuation may be partly or fully automated, and can serve a consumer (or benefit from his/her input) from a nearby or remote position.

Efforts have been made toward enhancing intercommunication between devices (also referred to herein as "entities") in an IOT setting. For instance, a device may be able to understand the capabilities of other surrounding (e.g., nearby) devices in a given environment based on prior, agreed-upon protocols. However, among other shortcomings, such arrangements have proven to be rigid and inflexible, with little to no capability for accommodating or making allowances for short- or long-term characteristics of the specific environment in which the devices operate.

BRIEF SUMMARY

In summary, one aspect of the invention provides a method of data-driven discovery of collaborative models in an internet of things, the method comprising: utilizing at least one processor to execute computer code that performs the steps of: at a device in the internet of things, collecting data on ambient conditions; storing the collected data at the device; and communicating with at least one other device in the internet of things to create and record collaborative states relative to the device and at least one other device.

Another aspect of the invention provides an apparatus for data-driven discovery of collaborative models in an internet of things, the apparatus comprising: at least one processor; and a computer readable storage medium having computer readable program code embodied therewith and executable by the at least one processor, the computer readable program code comprising: computer readable program code configured, at a device in the internet of things, to collect data on ambient conditions; computer readable program code configured to store the collected data at the device; and computer readable program code configured to communicate with at least one other device in the internet of things to create and record collaborative states relative to the device and the at least one other device.

An additional aspect of the invention provides a computer program product for data-driven discovery of collaborative models in an internet of things, the computer program product comprising: a computer readable storage medium having computer readable program code embodied therewith, the computer readable program code comprising: computer readable program code configured, at a device in the internet of things, to collect data on ambient conditions; computer readable program code configured to store the collected data at the device; and computer readable program code configured to communicate with at least one other device in the internet of things to create and record collaborative states relative to the device and the at least one other device.

A further aspect of the invention provides a method comprising: at a device in the internet of things, collecting data on ambient conditions; storing the collected data at the device; and communicating with at least one other device in the internet of things to create and record collaborative states relative to the device and the at least one other device; the creating and recording comprising: obtaining and adapting observations corresponding to the discovery of joint capabilities; wherein the creating and recording is performed passively; and developing a model; and cross-validating the model with data developed at another device.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2 provides an illustrative example of a data table relating to ambient conditions.

DETAILED DESCRIPTION

Figure 1:
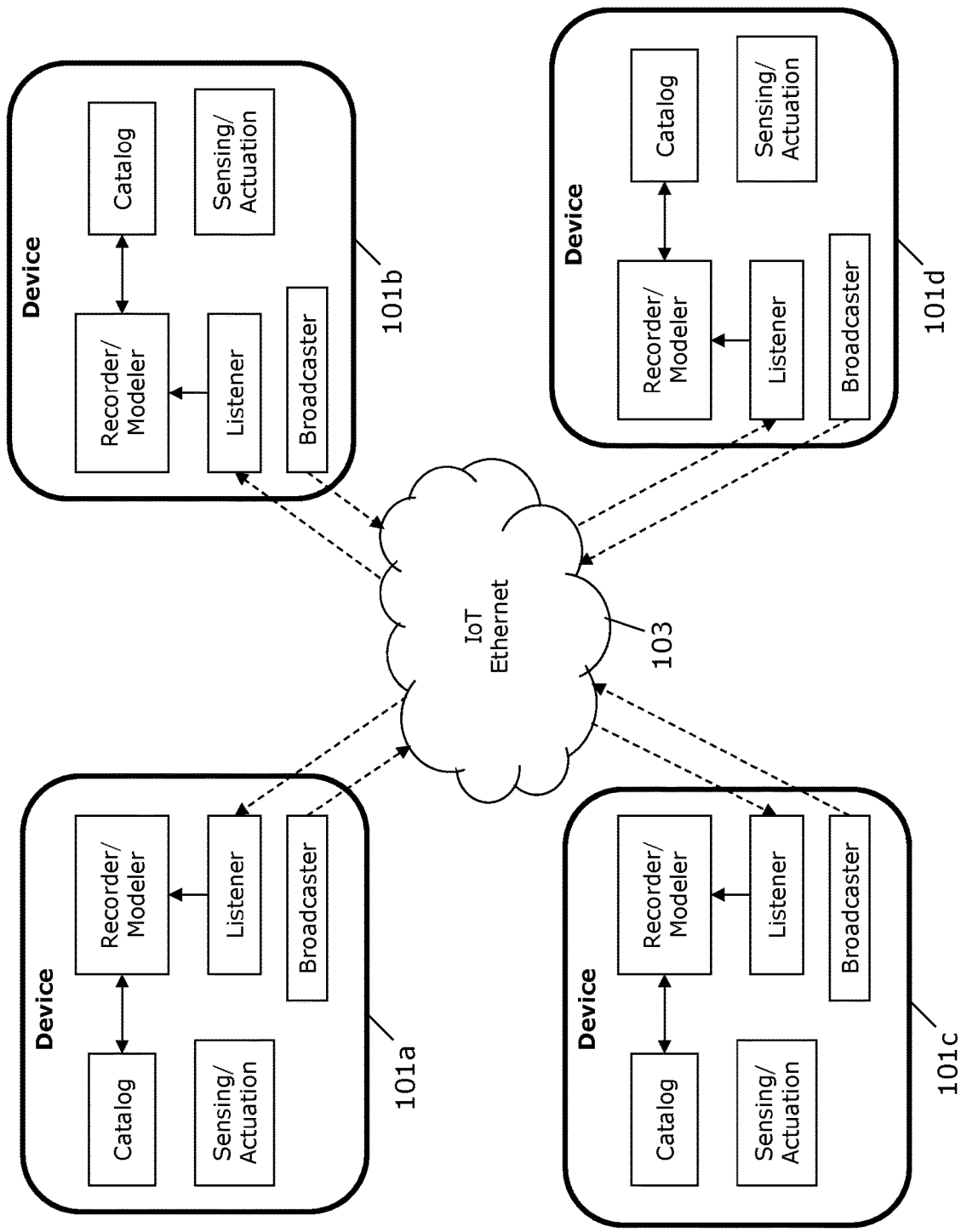
FIG. 1 schematically illustrates devices in an internet of things setting, in accordance with at least one embodiment of the invention.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an exemplary embodiment, most if not all of the process steps, components and outputs discussed with respect to FIG. 1 can be performed or utilized by way of a processing unit or units and system memory such as those indicated, respectively, at 16' and 28' in FIG. 4, whether on a server computer, a client computer, a node computer in a distributed network, or any combination thereof.

Broadly contemplated herein, in accordance with at least one embodiment of the invention, are methods and arrangements which provide data-driven discovery of collaborative causal models in an IOT setting. This can involve an IOT entity performing passive observations on neighborhood entities, such as those devices which are interconnected through the internet of things, and the creating and recording of all possible states relative to itself and other entities. Further, data analysis can be performed on observed data in a state to discover a collaborative model. (As understood herein, "creating" refers to an act of establishing a state, model, or other element based on collected data. This can also be understood as "discovering", inasmuch as a viable interdependent or collaborative relationship between devices is discovered to be viable and then can be recorded.)

Moreover, in accordance with at least one embodiment of the invention, there are broadly contemplated herein methods and arrangements for passive observation by free text analysis, bootstrapped with an IOT-relevant dictionary of keywords. Recoding and analysis can be resource-aware, with states being stored in finite on-board memory. Items relating to states may be reinforced, wherein non-reinforced items are dropped when memory or computing capacity is reached.

The features discussed above, and others, relating to at least one embodiment of the invention, will be better appreciated from the discussion which follows.

In accordance with at least one embodiment of the invention, in an internet of things (IOT) setting, data enters each of the devices via an arrangement of communication between connected devices, wherein a model is developed in which there is no agreed-upon (a priori) or pre-programmed mechanism of exchanging information, wherein one or more devices collect data and create collaborative models in a passive manner. Particularly, each device may undertake observations of ambient conditions, or of collectable data relative to one or more other devices, in a manner of passive participation, i.e., passively "listening" for data/information being furnished from elsewhere in the surrounding environment. Data so gathered may be used to create a catalog comprising a collection of such data, whereupon the data may be shared amongst any and all devices that may be in communication with one another. From this, a collaborative model of joint states (i.e., independent or collaborative states) relative to one or more other devices may be generated and stored in catalog at a device. These features stand in stark contrast to conventional methods of obtaining surrounding environmental data, wherein pre-programming is typically involved towards a more rigid and inflexible manner of data collection; such methods have largely been ineffective towards an end of efficient collaboration between devices to optimally model conditions and joint states in a given (e.g., interior) environment.

Stated another way, there are broadly contemplated herein, in accordance with at least one embodiment of the invention, methods and arrangements for the data-driven discovery of collaborative models in an IOT setting. At a device in the IOT setting, data are collected with respect to ambient conditions, and the collected data are stored at the device. At least one other device in the IOT setting is communicated with in order to create and record joint states relative to the device and the at least one other device. Collection and storage of the data, as well as the creating and recording of joint states, may preferably take place at the device. In accordance with at least one variant embodiment, any data may be stored at a location other than at the device. Such auxiliary (i.e., additional or alternative) storage can be realized with a secondary storage device attached to the original device. Another mechanism for auxiliary storage would be a peer-to-peer storage service such as a cloud based storage service.

In accordance with at least one embodiment of the invention, data observed or collected by an entity can be added to a compilation of information inherent to the entity, e.g., as may initially be provided or installed by the OEM (original equipment manufacturer) in storage at the entity, e.g., in a catalog. This compilation can constitute a set of initial data points that are built upon with newly acquired data points from passive observations of other entities (as discussed in further detail herebelow). This catalog at each device can then be used to ascertain joint states between the neighborhood entities (e.g., entities in a general physical vicinity of one another).

In accordance with at least one embodiment of the invention, as will be better understood from the discussion herebelow, such joint states can represent functional, interdependent relationships between entities that are ascertained or learned over time through passive data collection at an entity. By way of illustrative example, such interdependent relationships can relate to a manner of jointly controlling temperature or brightness within a room. Further illustrative examples will be appreciated from the ensuing discussion.

FIG. 1 schematically illustrates several devices in an IOT setting, in accordance with at least one embodiment of the invention. As shown, each of several devices 101*a/b/c/d* (of which four are shown here merely by way of illustrative example), can intercommunicate over a network such as an IOT Ethernet 103. Ethernet 103 is shown here merely by way of illustrative example, and other manners of communication are possible. Particularly, it is not essential for communication to take place via a centralized processor or server inasmuch as devices 101*a/b/c/d* can autonomously communicate with one another by virtue of an available communications network that accommodates components associated with individual devices.

In accordance with at least one embodiment of the invention, each device 101*a/b/c/d* includes, as shown, listener and broadcaster components, a recorder/modeler component, a sensing/actuation component and a catalog. As discussed elsewhere herein, the catalog may constitute storage at the device for storing collected data and/or developed collaborative models. The recorder/modeler, for its part, serves to create the models and send data to the catalog. The listener (itself in communication with the recorder/modeler) serves to receive data or other input via the IOT Ethernet 103 (or other communications medium) while the broadcaster serves to broadcast data or other output via the IOT Ethernet 103 (or other communications medium). The sensing/actuation component serves in a canonical capability sense, as defined by the OEM, to undertake sensing and actuation functions conventionally associated with IOT devices. Generally, the sensing/actuation component may serve to undertake sensing or measurement of ambient parameters such as temperature, brightness, sound, etc., as may be appropriate in the context of the device.

In accordance with at least one embodiment of the invention, the broadcaster in each device 101a/b/c/d can broadcast messages about individual canonical capabilities, e.g., what the device is able to sense and actuate. Thus, for instance, if a "smart" set of drapes or blinds can normally sense environmental parameters such as brightness and temperature, the broadcaster can be used to broadcast these capabilities to other "smart" devices in the IOT setting at hand.

In accordance with at least one embodiment of the invention, the listener of each device 101a/b/c/d undertakes passive observation of transmissions from other devices. Such transmissions from other devices can include transmissions of data sensed at other devices and/or canonical capabilities of other devices as noted above. Generally, the listener can mainly be concerned with receiving data broadcast from other devices, as opposed to sensing ambient conditions. Otherwise, in a variant arrangement, it is conceivable for a single listener or sensing/actuation device to perform both functions. Generally, in terms of undertaking passive observation of transmissions from other devices, among other possibilities, the listener could "wake up" when a transmission is received or could activate periodically to receive transmissions; this could depend, e.g., on the duty cycling of the listener, as may be programmed by the OEM.

In accordance with at least one embodiment of the invention, the recorder/modeler of each device 101a/b/c/d undertakes regression based correlation analysis (as an illustrative example) on collected data in order to discover joint capabilities of devices (which can be understood as forming at least a portion of the aforementioned "joint states"). This analysis can be utilized in cross-validation of the collected data set at a device, via assessing the same against data collected by one or more neighboring entities. Such cross-validation can assist considerably in estimating parameters of functions that can be performed efficiently by the devices collectively.

By way of an illustrative working example, in accordance with at least one embodiment of the invention, three of the devices 101a/b/c/d may include a set of drapes, an arrangement of lamps or light fixtures, and a soundproofing curtain. For the present example, it may be assumed that the soundproofing curtain is different from the set of drapes, while the arrangement of lamps/light fixtures may be considered to be one "device". Canonical capabilities of each device can be characterized as follows (and thus, broadcasted by the broadcaster of each respective device): drapes—temperature and brightness (abbreviated hereafter as "temp" and "bright"); light fixtures—temperature and brightness; soundproofing curtain—ambient sound. By way of an illustrative example, broadcast messages can take the following forms:

from drapes:
        <setting>30</setting><temp>20</temp><bright><2></bright>
    from light fixtures:
        <setting>10</setting><temp>20</temp><bright><2></bright>
    from sound proofing curtains:
        <setting>3</setting><sound>20</sound>

Thus, data tuples as exemplified above can include a setting, and one or more parameters corresponding to the setting.

FIG. 2 provides an illustrative example of a data table 205 relating to ambient conditions, in accordance with at least one embodiment of the invention. Data tuples in the table represent different options available for collecting data, as broadly understood herein, relative to IOT devices and their capacities for collaboratively undertaking one or more given tasks. Thus, for example, if an intended future task involves controlling temperature and brightness in a room, table 205 indicates that Drapes (D) and Light Fixtures (LF) can be adjusted for the purpose. It also indicates which settings of the two devices (D, LF) will affect temperature and brightness in which way. As noted further above, at each device correlation and regression can be performed independently on the data in order to learn a model. With respect to a predetermined general task or objective (e.g., controlling temperature and/or brightness), a subset of states can be recorded and learned. In other words, an IOT device can act to record and learn only the states which are related to the capabilities of the device; for this reason, in the present example, a device thus might may not end up entering data in each cell of the matrix (of table 205).

It can be appreciated from the foregoing that, in accordance with at least one embodiment of invention, a technical improvement is represented at least via methods and arrangements which provide data-driven discovery of collaborative causal models in an internet of things (IOT) setting, wherein the IOT entity can perform passive observations on neighborhood entities, and all possible states can be recorded by the entity.

In accordance with at least one embodiment of the invention, very generally, quantitative values as determined herein, or other data or information as used or created herein, can be stored in memory or displayed to a user on a screen, as might fit the needs of one or more users.

Figure 3:
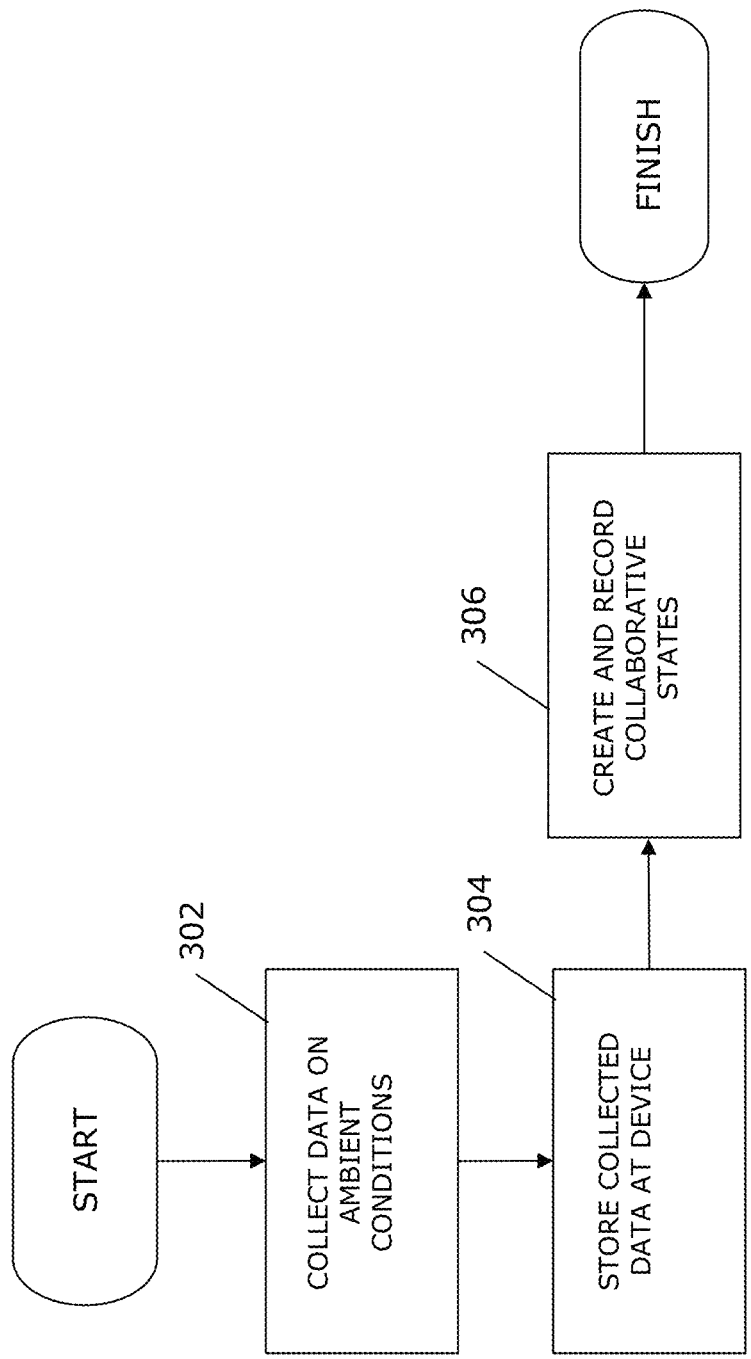
FIG. 3 sets forth a process more generally for data-driven discovery of collaborative models in an internet of things setting.

FIG. 3 sets forth a process more generally for managing a consistency group for computing sites, in accordance with at least one embodiment of the invention. It should be appreciated that a process such as that broadly illustrated in FIG. 3 can be carried out on essentially any suitable computer system or set of computer systems, which may, by way of an illustrative and non-restrictive example, include a system such as that indicated at 12' in FIG. 4. In accordance with an example embodiment, most if not all of the process steps discussed with respect to FIG. 3 can be performed by way of a processing unit or units and system memory such as those indicated, respectively, at 16' and 28' in FIG. 4.

As shown in FIG. 3, in accordance with at least one embodiment of the invention, at a device in the internet of things setting, data are collected on ambient conditions (302), and the collected data are stored at the device (304). At least one other device in the internet of things setting is communicated with to create and record collaborative states relative to the device and the at least one other device (306). Other variants and embodiments are broadly contemplated herein.

Figure 4:
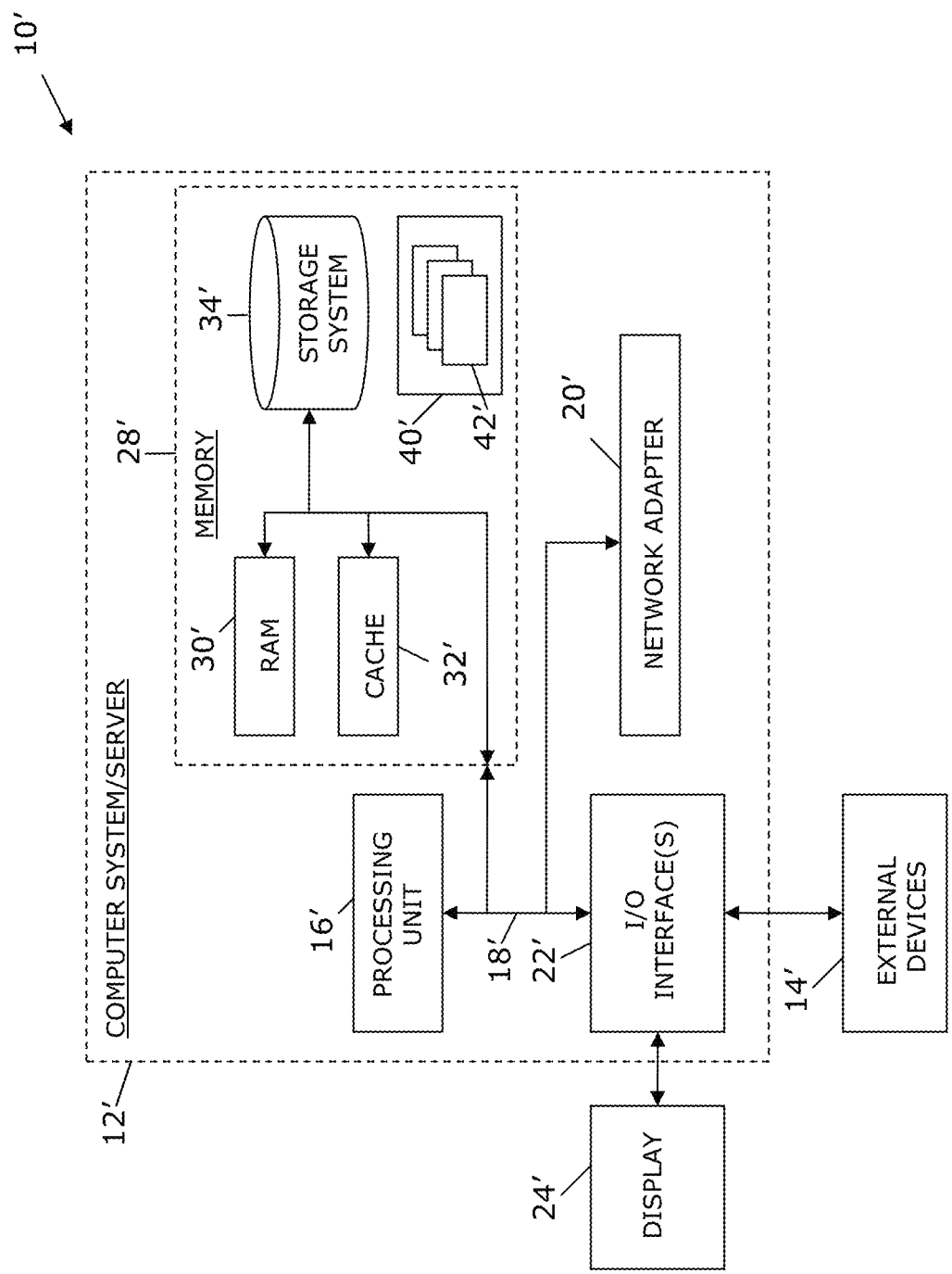
FIG. 4 illustrates a computer system.

Referring now to FIG. 4, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of data-driven discovery of collaborative models in an internet of things, said method comprising:

receiving, from a user, an indication to adjust at least one environmental parameter setting to a user desired setting in a predetermined area;

collecting, using a sensing component of a device, data on ambient conditions in the predetermined area, wherein the device is included in the internet of things comprising a plurality of interconnected devices;

storing the collected data in an accessible database of the device;

communicating, to at least one other device in the internet of things and using a broadcasting component of the device, the device's canonical capabilities and receiving, from the at least one other device, canonical capabilities associated with the at least one other device;

constructing, at the device using a modeler component of the device, a data table comprising a plurality of potential joint states, wherein a joint state represents a joint capability of more than one of the plurality of devices collaboratively undertaking one or more tasks with respect to the environmental parameter setting, wherein each state of the plurality of potential states identifies an effect that the canonical capabilities of the device and the canonical capabilities associated with the at least one other device have on the at least one environmental parameter at a proposed device setting;

determining, based on the data table, a setting to be adjusted on the device and at least one other setting to be adjusted on the at least one other device to accomplish the user desired setting; and adjusting, based on the determining, the setting and the at least one other setting.

2. The method according to claim 1, wherein said creating and recording comprises storing, at the device, the collaborative states relative to the device and the at least one other device.

3. The method according to claim 2, wherein said storing comprises storing in a catalog.

4. The method according to claim 2, wherein said storing comprises storing in on-board memory at the device.

5. The method according to claim 1, wherein said creating and recording comprises contributing to a collaborative model.

6. The method according to claim 1, wherein said creating and recording comprises obtaining and adapting observations corresponding to the discovery of joint capabilities.

7. The method according to claim 6, wherein:
said obtaining and adapting comprises determining at least one relevant task; and
said recording comprises recording at least one relevant subset corresponding to the determined at least one relevant task.

8. The method of claim 6, wherein said obtaining and adapting of observations is performed passively.

9. The method according to claim 8, wherein said obtaining and adapting is performed via free text analysis.

10. The method according to claim 9, wherein the free text analysis is bootstrapped with a dictionary of keywords relevant to the internet of things.

11. The method according to claim 1, wherein said creating and recording is performed passively.

12. The method according to claim 1, wherein:
said creating and recording comprises developing a model; and
said method comprises cross-validating the model with data developed at another device.

13. An apparatus for data-driven discovery of collaborative models in an internet of things, said apparatus comprising:
a sensing component;
a broadcasting component;
at least one processor; and
a computer readable storage medium having computer readable program code embodied therewith and executable by the at least one processor, the computer readable program code comprising:
computer readable program code configured to receive an indication to adjust at least one environmental parameter setting to a user desired setting in a predetermined area;
computer readable program code configured to collect, using the sensing component of a device in the internet of things, data on ambient conditions in the predetermined area, wherein the device is included in the internet of things comprising a plurality of interconnected devices;
computer readable program code configured to store the collected data in an accessible database of the device;
computer readable program code configured to communicate to at least one other device in the internet of things and using the broadcasting component of the device, the device's canonical capabilities and receive, from the at least one other device, canonical capabilities associated with the at least one other device;
computer readable program code configured to construct, at the device using a modeler component of the device, a data table comprising a plurality of potential joint states, wherein a joint state represents a joint capability of more than one of the plurality of devices collaboratively undertaking one or more tasks with respect to the environmental parameter setting, wherein each state of the plurality of potential states identifies an effect that the canonical capabilities of the device and the canonical capabilities associated with the at least one other device have on the at least one environmental parameter at a proposed device setting;
computer readable program code configured to determine, based on the data table, a setting to be adjusted on the device and at least one other setting to be adjusted on the at least one other device to accomplish the user desired setting; and
computer readable program code configured to adjust the setting and the at least one other setting.

14. A computer program product for data-driven discovery of collaborative models in an internet of things, said computer program product comprising:
a computer readable storage medium having computer readable program code embodied therewith, the computer readable program code comprising:
computer readable program code configured to receive an indication to adjust at least one environmental parameter setting to a user desired setting in a predetermined area;
computer readable program code configured to collect, using the sensing component of a device in the internet of things, data on ambient conditions in the predetermined area, wherein the device is included in the internet of things comprising a plurality of interconnected devices;
computer readable program code configured to store the collected data in an accessible database of the device;
computer readable program code configured to communicate to at least one other device in the internet of things and using the broadcasting component of the device, the device's canonical capabilities and receive, from the at least one other device, canonical capabilities associated with the at least one other device;
computer readable program code configured to construct, at the device using a modeler component of the device, a data table comprising a plurality of potential joint states, wherein a joint state represents a joint capability of more than one of the plurality of devices collaboratively undertaking one or more tasks with respect to the environmental parameter setting, wherein each state of the plurality of potential states identifies an effect that the canonical capabilities of the device and the canonical capabilities associated with the at least one other device have on the at least one environmental parameter at a proposed device setting;
computer readable program code configured to determine, based on the data table, a setting to be adjusted on the device and at least one other setting to be adjusted on the at least one other device to accomplish the user desired setting; and
computer readable program code configured to adjust the setting and the at least one other setting.

15. The computer program product according to claim 14, wherein the creating and recording comprises storing, at the device, the collaborative states relative to the device and the at least one other device.

16. The computer program product according to claim 15, wherein the storing comprises storing in a catalog.

17. The computer program product according to claim 14, wherein the storing comprises contributing to a collaborative model.

18. The computer program product according to claim 14, wherein the creating and recording comprises obtaining and adapting observations corresponding to the discovery of joint capabilities.

19. The computer program product according to claim 18, wherein the obtaining and adapting of observations is performed passively.

* * * * *